A. W. GRAY.
DEVICE FOR MEASURING MATERIALS FOR TOOTH FILLINGS.
APPLICATION FILED JAN. 24, 1918.
1,286,881. Patented Dec. 3, 1918.
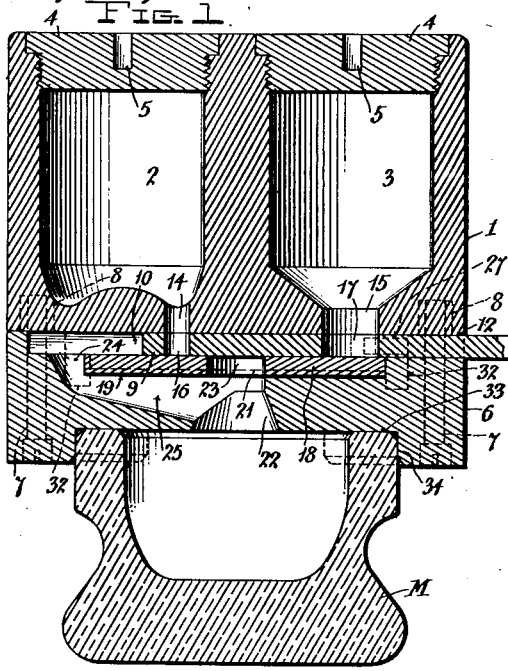
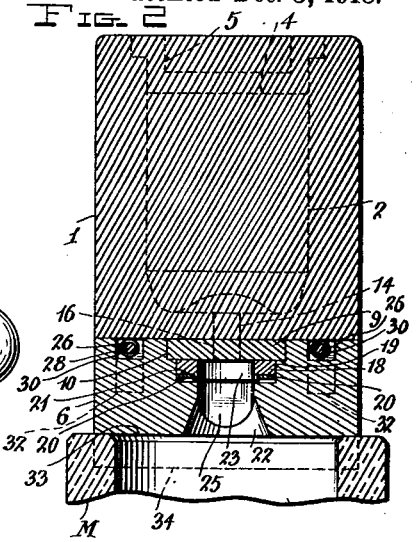
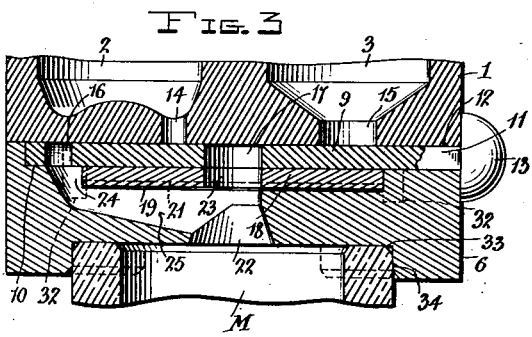
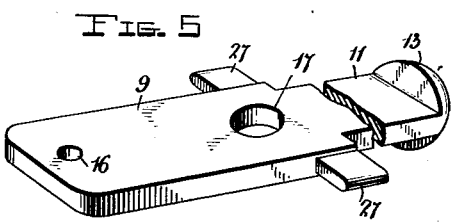
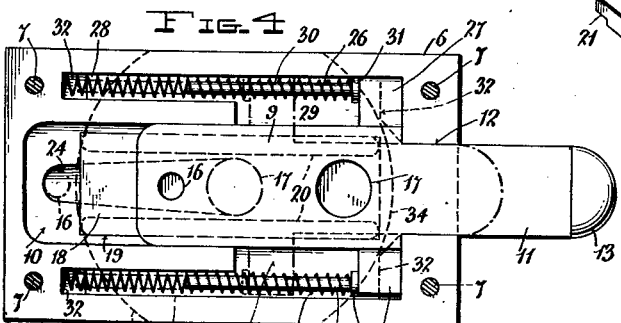
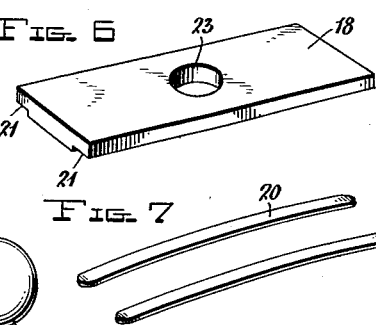
Inventor
Arthur W. Gray,
By
Attorney
Witnesses

UNITED STATES PATENT OFFICE.

ARTHUR W. GRAY, OF MILFORD, DELAWARE, ASSIGNOR TO THE L. D. CAULK COMPANY, OF MILFORD, DELAWARE, A CORPORATION OF DELAWARE.

DEVICE FOR MEASURING MATERIALS FOR TOOTH-FILLINGS.

1,286,881.　　　　　Specification of Letters Patent.　　　Patented Dec. 3, 1918.

Application filed January 24, 1918. Serial No. 213,597.

*To all whom it may concern:*

Be it known that I, ARTHUR W. GRAY, a citizen of the United States, residing at Milford, in the county of Sussex and State of Delaware, have invented new and useful Improvements in Devices for Measuring Materials for Tooth-Fillings, of which the following is a specification.

This invention relates to an improved device for measuring materials for tooth fillings, such, for example, as powdered metal and mercury used in amalgam fillings, the device being of that general type which delivers measured charges of the materials to be mixed, with the objects of insuring accuracy in the proportioning of the materials, eliminating waste and saving time.

The principal objects of the present invention, briefly stated, are to provide a measuring device of the type referred to which shall be exceedingly accurate in its measuring function, which shall be so constructed that it may be manufactured with great facility and with no liability, as an incident of any of the manufacturing steps, of defeating or impairing its accuracy, which shall have highly efficient wear resisting properties, whose accuracy shall not be impaired by wear, which will not be appreciably affected by any leakage of the materials between the relatively movable parts, which may be readily cleaned, whose coöperating contacting surfaces may be readily and accurately renewed, which may be operated with great facility and speed, and which shall accurately locate the delivered charges with reference to the receptacle or other device intended for their deposit.

With the above objects in view the invention consists generally of a device having a controlling valve, the principal features of the invention involving certain details of structure and combination appurtenant to the valve and its associated elements. Other features of the invention are concerned with the casing of the device with particular reference to the object of accurately locating the measured charges in the receptacle or other medium intended for their deposit.

An embodiment of the invention is illustrated in the accompanying drawing, wherein:

Figure 1 is a central longitudinal vertical sectional view of the device showing the parts in their normal positions and ready for operation.

Fig. 2 is a central cross-sectional view.

Fig. 3 is a view similar to Fig. 1 but of fragmentary character, showing the parts of the device in the relations which they assume upon the completion of the operation.

Fig. 4 is a detail plan view of the separable base portion and the elements housed therein.

Fig. 5 is a detail perspective view of the slide valve.

Fig. 6 is a detail perspective view of the follower plate in coöperation with the slide valve.

Fig. 7 is a detail perspective view of a pair of springs which act on the follower plate shown in Fig. 6.

Similar characters of reference designate corresponding parts throughout the several views.

The casing of the device has a body portion 1 of suitable material, e. g., glass, wood, vulcanized material or bakelite and preferably in the form of an oblong block. Said body portion is provided or formed with receptacles 2 and 3 for the materials to be mixed. As shown these receptacles are molded in the body portion and are open to the upper face of the body portion, being normally closed by plugs or stoppers 4 or equivalent devices which are preferably threaded in the upper ends of the receptacles and are formed with diametrical grooves 5 for the reception of a coin or other implement by which they may be turned to effect their removal or replacement.

The casing of the device also includes a base portion 6 which is associated with the body portion 1 and is held against the under-face of said body portion by fastening screws 7, for whose reception the body portion is preferably provided with bushings 8. The base portion 6 is made separable to facilitate manufacture and to provide for access to the working parts. These parts operate between the body portion and the base portion and are preferably housed in the base portion.

The principal operating element of the device is a slide valve 9 (Fig. 5) which has in general the form of an oblong plate and is slidably mounted in a recess 10 formed in the upper face of the base portion 6, the said recess being of substantially greater length than the active portion of the valve 9 in order to provide for the requisite sliding movement of said valve. The valve 9 is provided at its front end with an operating extension 11 which projects through a recess 12 formed in the adjacent end and in the upper face of the base portion 6 and may be provided with a terminal operating knob 13 for engagement by the operator's thumb or finger.

The bottoms of the receptacles 2 and 3 may be formed in any desired manner to facilitate the discharge of the materials and are provided with discharge passages 14 and 15 respectively. The passage 14 of the receptacle 2 is preferably, and as shown, located somewhat forwardly of the axial center of the receptacle in order that the length of the valve 9 may be reduced as far as possible and that the working stroke of said valve may be confined within the area of the adjoining faces of the body portion 1 and base portion 6. The valve 9 is provided with openings 16 and 17 for coöperation with the respective passages 14 and 15. These openings are normally in register with the said passages, as shown in Fig. 1, and, by virtue of a follower plate 18 arranged under and in coöperation with the valve 9, function as pockets for accurately receiving and setting off measured charges of the material.

The follower plate 18 is arranged in a recess 19 which is counter-sunk in the recess 10 and is pressed against the valve 9 by suitable springs 20 which are preferably of the flat leaf type. In order that the springs 20 may be held against lateral displacement the plate 18 has the cross-sectional shape shown in Figs. 2 and 6 according to which its under-face has longitudinal marginal recesses which provide shoulders 21 by which the springs 20 are confined against lateral movement.

The batches of material are preferably discharged through a common opening 22 in the under-face of the base portion 6, the said opening being relatively small as compared with the extent of said under face. The openings by which the materials are transferred from the pockets 16 and 17 of the valve 9 to the discharge opening 22 are associated with the follower plate 18. As shown and preferred one of the transfer openings, as 23, for coöperation with the opening 17, is directly formed in the follower plate 18 and the other transfer opening, as 24, for coöperation with the opening 16, although functionally in association with said follower plate is physically formed in the base portion 6, just beyond the rear end of the follower plate. The transfer opening 24 is in open communication with a longitudinal duct 25 which extends under the follower plate 18 to the discharge opening 22 and the said discharge opening is open at its upper end to the recess 19 and is in direct registry with the transfer opening 23.

The valve 9 is held in its normal position in which its openings 16 and 17 register with the respective passages 14 and 15 by suitable spring means. As shown and preferred expansion helical springs 26 are arranged one at each side of said valve and act on laterally projecting lugs 27 with which the valve is provided, the lugs 27 preferably being of less thickness than the valve in order that their faces may not contact with the adjacent faces of the body portion 1 and base portion 6, thereby to reduce frictional resistance to the movements of the valve. The springs 26 are housed in grooves 28 which are parallel to the recess 10 and in their forward portions are provided with clearances 29 which extend to the recess 10 and through which the lugs 27 are movable. In order to prevent buckling of the portions of the springs 26 which adjoin the clearances 29, said springs are fitted with inclosed reinforcing rods 30 whose rear ends at all times project into the grooves 28, and the said rods are preferably formed with heads 31 to prevent their lengthwise displacement relatively to the springs 26.

The grooves 28 at their rear ends and the clearances 29 at their front ends are preferably formed with counter-sunk recesses 32 whose function is to trap any alloy which may work, by leakage, from the containers. If, on account of any peculiarity of its composition, or on account of any slight wear between the adjacent surfaces of the valve 9 and body portion 1, any material should leak from its container, the leakage in any case will be very slight and gradual and the material, incident to repeated operations of the device, will find its way into the clearances 29 and grooves 28 whence it will ultimately pass to the recesses 32. In this way any substantial lodgment of material which might appreciably interfere with the operation of the device is prevented while at the same time such material as may happen to leak, under the exceptional circumstances stated, may readily be removed.

The base portion 6 is preferably so formed that it may be fitted and accurately centered upon the receptacle or mortar M in which the measured charges are deposited. For this purpose said base portion is preferably recessed in its under-face, as at 33, to conformably take over the upper edge of the mortar. The mortar shown and which is well adapted for coöperation with the device is of the form disclosed in the design patent to F. L. Grier, No. 50,471, granted March 20, 1917. For coöperation with this form of mortar the recess 33 has arcuate end walls 34 conforming to the curvature of the mortar and whose extent is such as to prevent any relative lateral displacement of the mortar and the base portion 6. The recess 33 may, however, obviously, be shaped for coöperation with mortars whose form varies from that shown.

The operation of the device will be readily apparent from the foregoing description. With the valve 9 in its normal position as shown in Fig. 1, the openings 16 and 17 of said valve, functioning as pockets by virtue of the follower plate 18, will contain measured charges of the materials, of which mercury may be assumed to be in the container 2 and powdered metal in the container 3. The only operation involved is the inward movement of the valve 9 and for this operation but one hand is needed, the device being grasped, if by the right hand, with the thumb against the end face of the base portion 6 remote from the head 13 and the middle finger resting on said head. Thereupon by means of the head 13 the valve 9 is pushed inward until its movement is positively arrested at which time its opening 17 will aline with the transfer opening 23 and its opening 16 will aline with the transfer opening 24, as shown in Fig. 3. When this relation obtains the measured charges of material will pass from the openings 16 and 17 through the openings 24 and 23 to the final discharge opening 22 from which they drop into the mortar or other device intended for their deposit. The operation having been completed, the finger pressure on the head 13 is released and the springs 26 restore the valve 9 to its initial and normal position. The head 13 is preferably so located that, by coöperation with the adjacent end faces of the body portion 1 and base portion 6, it may function as a positive stop to limit the inward movement of the valve 9. An advantage is thereby secured in that in case the inward movement of the valve 9 is arrested before the head 13 contacts with the adjacent end faces of the body portion 1 and base portion 6 an indication will thus be had of the deposit of material upon the working surfaces or within the recesses in which the valve 9 and lugs 27 operate. Thereupon the device, by the removal of the screws 7, may be dismantled to enable the parts to be cleaned. From a manufacturing standpoint an advantage is secured in the facility and certainty with which the openings 16 and 17 may be accurately proportioned. This is due to the fact that the depth of said openings will be co-extensive with the thickness of the valve 9 and the relative proportions of the charges will be dependent wholly upon the diameters of said openings. Consequently no possibility of error is introduced in forming these openings for the correct proportioning of the batches of material.

From the standpoint of operation and use an advantage is secured in that the full charge of mercury will always be delivered by the opening 16. This is due to the fact that the construction provides for such normal leakage of air that the surface tension of the mercury on the walls of said opening will be entirely overcome.

Further advantages, both in manufacture and operation are secured by virtue of the fact that the relatively movable parts have flat coöperating surfaces. These surfaces may be readily and accurately produced in original manufacture and efficiently resist the leakage of materials from the containers 2 and 3 while at the same time admitting of the requisite freedom of movement of the valve 9. Moreover by virtue of the flat character of the contacting surfaces of the relatively movable parts it is practical to make the device wear compensating, this feature being achieved by the arrangement of the follower plate 19 whereby said plate may be pressed against the valve 9. After a substantial period of use in case any wear should develop on the working surfaces or any of them, they may be readily trued and renewed and the device restored to its normal efficiency, the springs which act on the follower plate 18 compensating for any minute changes in the elevations of the flat working surfaces incident to their renewal. The renewal of the surfaces of the valve 9 will, of course, reduce the thickness of said valve but this is compensated by the plate 18 and is without effect on the correct proportioning of the material, since such proportioning, as above stated, is dependent on the diameters, and not on the depth, of the valve openings 16 and 17.

While the device has been shown as equipped with two containers, with special regard to the mixing of mercury and powdered metal used in amalgam fillings, it will be understood that the device may have more than two containers and may provide for the mixing together of more than two materials, if a mixture of a greater number of materials be required in some environment for which the device may be adaptable.

It will also be understood that the invention includes within its purview various minor modifications and changes as will fall within the scope of the following claims.

Having fully described my invention, I claim—

1. In a device of the type set forth, in combination, a pair of containers, each having a discharge passage, a base portion upon which said containers are mounted, the base portion having material outlets, a slide valve movable under the containers and controlling the discharge passages thereof, the slide valve having openings normally in registry with said discharge passages, and a follower plate arranged under the slide valve and spring-pressed against the same, said follower plate causing said valve openings to function as material holding pockets and having associated transfer openings through which the materials pass from the pockets in the slide valve to said outlets upon a movement of said valve to effect the registry of said pockets with the respective transfer openings, one of said transfer openings being formed in the follower plate and the other transfer opening being formed in the base portion immediately in the rear of the follower plate.

2. In a device of the type set forth, in combination, a casing comprising a body portion, having a container with a discharge passage opening to the under face of said body portion and a base portion secured against the under face of the body portion and having a discharge opening, a slide valve movable under the container and controlling the discharge passage thereof, the slide valve having an opening normally in registry with said discharge passage and a follower plate arranged under the slide valve and spring-pressed against the same, said follower plate causing said valve opening to function as a material holding pocket and having an associated transfer opening through which the material passes from the pocket in the slide valve to the discharge opening upon a movement of said valve to effect the registry of said pocket and said transfer opening, the base portion having a recess in which the slide valve operates and having a counter-sunk recess in which the follower plate is fitted.

3. In a device of the type set forth, in combination, a pair of containers, each having a discharge passage, a base portion upon which said containers are mounted, the base portion having a single discharge opening, a slide valve movable under the containers and controlling the discharge passages thereof, the slide valve having openings normally in registry with said discharge passages and a follower plate arranged under the slide valve and spring-pressed against the same, said follower plate causing said valve openings to function as material holding pockets and having associated transfer openings with which said pockets register upon an operative movement in one direction of the slide valve, said transfer openings being in communication with said single discharge opening.

4. In a device of the type set forth, in combination, a casing provided with a pair of containers, each having a discharge passage, a valve movable under said containers and controlling said discharge passages, said valve having means for the reception of measured charges of the material in said containers, said casing having a single discharge opening, and a part having transfer openings in communication with said discharge opening and to which the measured charges are passed by the valve upon an operative movement in one direction of said valve.

5. In a device of the type set forth, in combination, a casing provided with a pair of containers, each having a discharge passage, a slide valve movable under said containers and controlling said discharge passages, said casing having a single discharge opening, said valve having means for the reception of measured charges of material in said containers, and means for directing the charges of material from said valve upon the completion of an operative movement thereof in one direction to said single discharge opening.

6. In a device of the type set forth, in combination, a casing provided with material containing means, said casing having a discharge opening in its under face, said discharge opening being relatively small as compared with the extent of said under face, and means for transferring a measured charge of material from said containing means to said discharge opening, said casing having its said under face recessed to take over a receptacle intended for the deposit of material from said discharge opening and positively to center said casing relatively to said receptacle.

7. In a device of the type set forth, in combination, a body portion provided with a container having a discharge passage, a base portion fitted against the under face of the body portion, a slide valve movable between the base portion and the body portion and controlling the discharge passage of said container, the base portion having a recess in which the slide valve operates, and springs for holding the slide valve in a normal position, the base portion having grooves parallel to said recess and in which said springs are confined.

8. In a device of the type set forth, in combination, a body portion provided with a container having a discharge passage, a base portion fitted against the under face of the body portion, a slide valve movable between the base portion and the body portion and controlling the discharge passage of said container, the base portion having a recess in which the slide valve operates, and springs for holding the slide valve in a normal position, the base portion having grooves parallel to said recess and in which said springs are confined, said grooves having recesses at their ends which serve as traps for any material which may escape by leakage from said container.

9. In a device of the type set forth, in combination, a body portion provided with a container having a discharge passage and a base portion fitted against the under face of the body portion and forming a companion element thereof, a slide valve movable between said companion elements for controlling the discharge passage, one of said companion elements having a recess for said slide valve, said slide valve having oppositely projecting lugs, and a pair of springs housed in one of said companion elements and acting on said lugs to hold said slide valve in its normal position.

10. In a device of the type set forth, in combination, a body portion provided with a container having a discharge passage, a base portion fitted against the under face of the body portion, and having a discharge opening, a slide valve controlling said discharge passage and effective to transfer a measured charge of material from said container to said discharge opening, and a follower plate coöperating with and arranged under said valve, said base portion having a recess for said slide valve and a countersunk recess for said follower plate.

11. In a device of the type set forth, in combination, a body portion provided with a pair of containers, each having a discharge passage, a base portion fitted to the under face of the body portion and having a single discharge opening and a single slide valve controlling both of said discharge passages and means coöperating with said slide valve whereby the latter is operative in a single movement to effect the transfer of measured charges of material to said discharge opening.

12. In a device of the type set forth, a body portion having a flat under face, and provided with a container having a discharge passage open to said under face, a base portion fitted tightly against the flat under face of said body portion, screws connecting said base portion and body portion, said base portion having a recess in its upper face and a discharge opening extending to its under face, a slide valve for which said recess provides a seating and guide, said slide valve having an opening normally alining with said discharge passage, a second recess countersunk within the first one, and a follower plate in the second recess acting on said slide valve from below to hold said valve against the flat under face of said body portion, said follower plate having a transfer opening asociated therewith which, when the valve is operated extends between the opening in the valve and said discharge opening.

13. In a device of the type set forth, a body portion having a flat under face, and provided with a container having a discharge passage open to said under face, a base portion fitted tightly against the flat under face of said body portion, screws connecting said base portion and body portion, said base portion having a recess in its upper face and a discharge opening extending to its under face, a slide valve for which said recess provides a seating and guide, said slide valve having an opening normally alining with said discharge passage, said base portion having grooves in its upper face at the sides of and parallel to said recess and having clearances extending laterally between said recess and grooves, said slide valve having lateral projections extending through said clearances, and springs disposed in said grooves and acting on said projections to hold said slide valve in its normal position.

14. In a device of the type set forth, a body portion, provided with a container having a discharge passage opening to a face of said body portion, a base portion secured to said body portion, a slide valve arranged between said base portion and said body portion and controlling said discharge passage, the base portion having a recess in its upper face, and means for holding said slide valve against the adjacent face of said body portion, comprising a follower plate acting on said slide valve from below and fitted in said recess and parallel leaf springs also fitted in said recess at opposite sides thereof and acting on the under face of said follower plate, the latter being formed with shoulders to confine said springs against lateral displacement.

In testimony whereof I have hereunto set my hand in presence of two subscribing witnesses.

ARTHUR W. GRAY.

Witnesses:
 W. G. SAMMONS,
 W. S. DAUGHERTY.